United States Patent [19]

Garman

[11] 3,887,883
[45] June 3, 1975

[54] GAS LASER TUBE AND METHOD OF FABRICATING SAME

[76] Inventor: Lewayne E. Garman, 938 Iris, Sunnyvale, Calif. 94086

[22] Filed: Oct. 29, 1973

[21] Appl. No.: 410,608

[52] U.S. Cl. ............... 331/94.5 PE; 331/94.5 D
[51] Int. Cl. ............................... H01s 3/22
[58] Field of Search..... 331/94.5 C, 94.5 D, 94.5 G, 331/94.5 PE; 350/245, 252, 257

[56] References Cited
UNITED STATES PATENTS

| | | | |
|---|---|---|---|
| 3,437,950 | 4/1969 | Okaya | 331/94.5 |
| 3,599,107 | 8/1971 | Knudson | 331/94.5 |
| 3,628,175 | 12/1971 | Rigden | 331/94.5 D |

Primary Examiner—Vincent P. McGraw
Assistant Examiner—Michael J. Tokar
Attorney, Agent, or Firm—Lowhurst, Aine & Nolan

[57] ABSTRACT

An improved gas laser tube is fabricated by counter boring the ends of a tubular aluminum extrusion having an inner tubular portion supported from an outer tubular portion via the intermediary of a plurality of radially directed support vanes or legs. Metallic transverse walls are sealed across the ends of the tubular extrusion to define the ends of a gas tight metallic envelope. An electrically insulative glow discharge tube is axially disposed within and supported by the inner tubular portion of the extrusion in axial alignment with an optical resonator of the laser tube.

7 Claims, 5 Drawing Figures

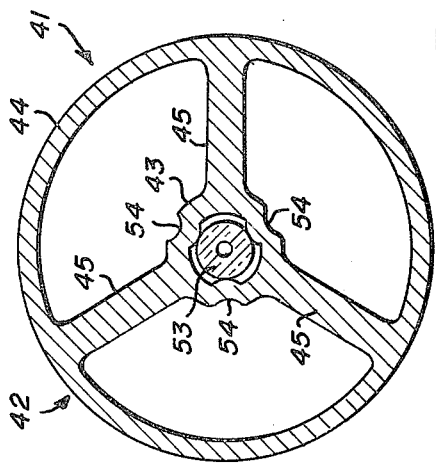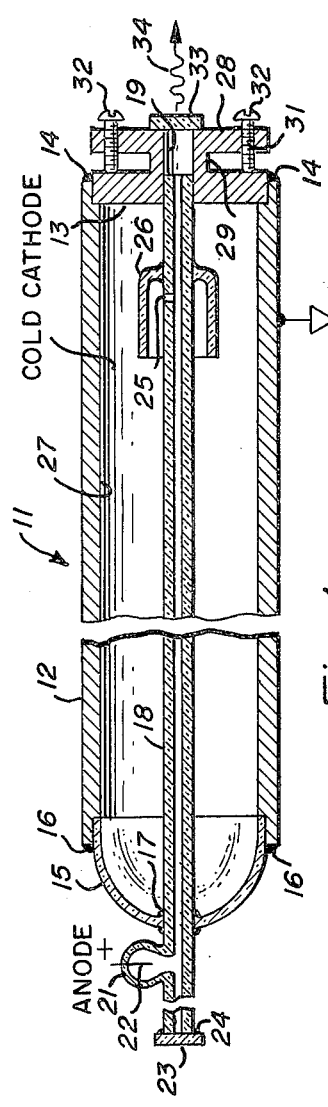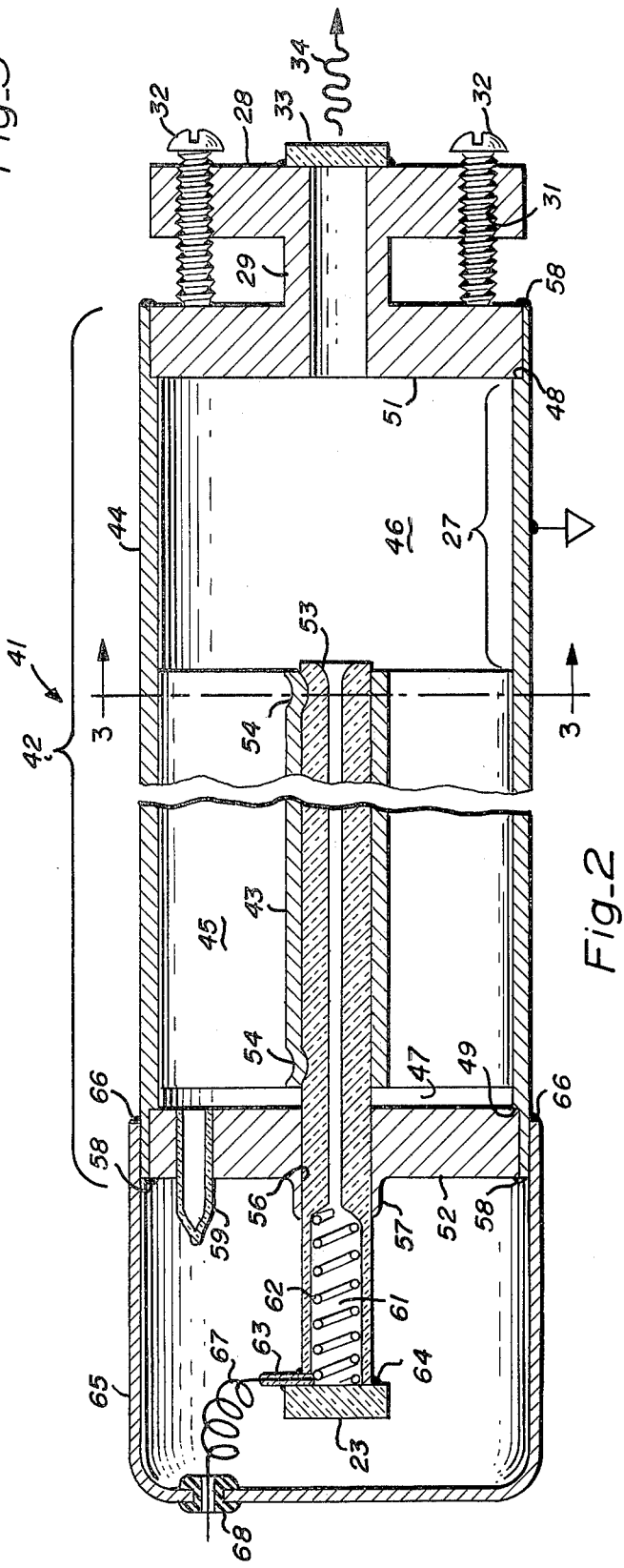

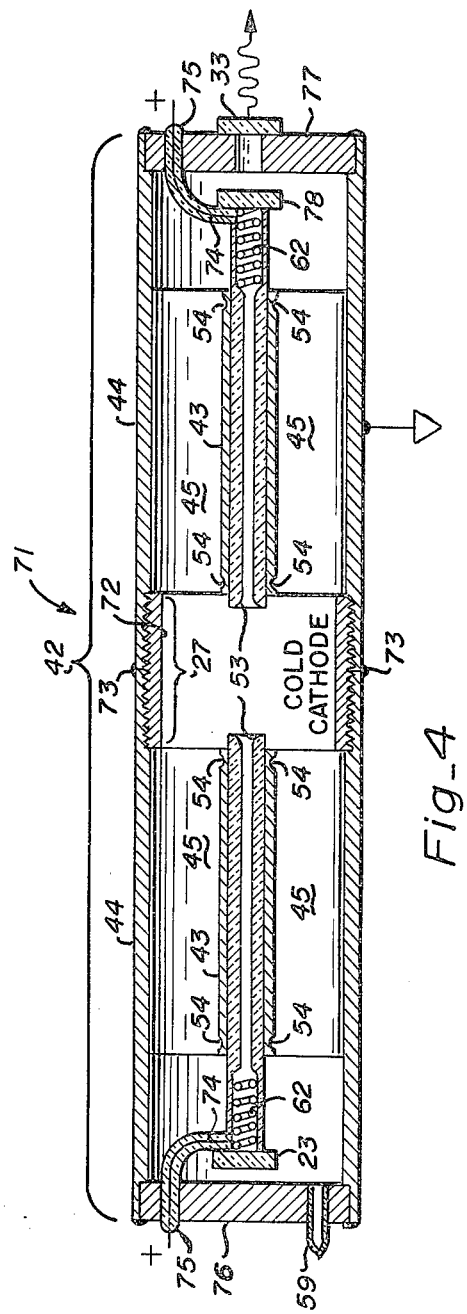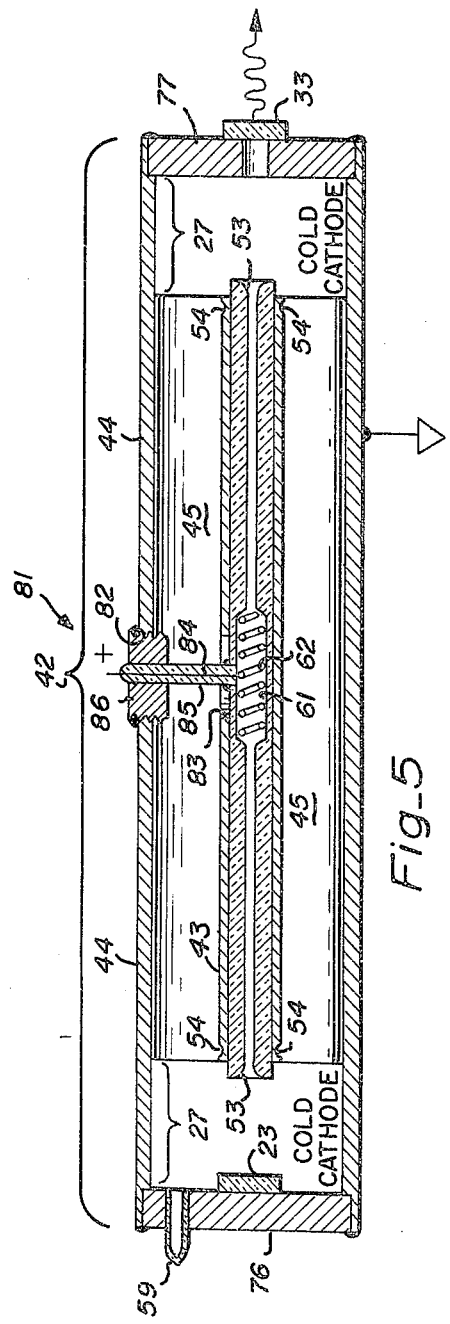
Fig.-4
Fig.-5

GAS LASER TUBE AND METHOD OF FABRICATING SAME

RELATED CASES

The anode chamber of the glow discharge tube forms the subject matter of and is claimed in copending U.S. application Ser. No. 410,607 filed Oct. 29, 1973.

BACKGROUND OF THE INVENTION

The present invention relates in general to gas laser tubes and more particularly to an improved laser tube and method of fabricating same wherein the envelope of the laser is predominantly metallic and wherein the glow discharge tube is supported intermediate its length from the outer metallic envelope.

DESCRIPTION OF PRIOR ART

Heretofore, gas lasers have been built wherein at least a substantial portion of the envelope for the gas laser comprised an aluminum tube which was sealed at one end by means of a transverse metallic end wall and at the other end by means of an outwardly domed glass end wall. The outwardly domed glass end wall was centrally apertured and sealed to a glass capillary glow discharge tube.

The problem of the prior art gas laser tube, as above described, was that the glass capillary glow discharge tube was not supported intermediate in its length within the metallic tubular envelope portion. Thus the tube was relatively fragile. In addition, the domed glass end wall portion was made by glass blowing. Therefore, due to the limitations of precision glass blowing, concentricity of the glow discharge tube could not be assured relative to the metallic envelope. Thus, substitution of one gas laser tube for another, in a given socket or mount, required that the substituted tube be realigned relative to the output optics of the socket in which it was placed due to the lack of concentricity between different laser tubes. Moreover, the glass blowing steps are relatively expensive fabrication steps.

Therefore it is desired to obtain a mass produceable improved gas laser tube wherein the tube construction is such as to provide a greater degree of precision and concentricity while providing a more rugged and substantially less expensive tube.

SUMMARY OF THE PRESENT INVENTION

The principal object of the present invention is the provision of an improved gas laser tube and improved method for fabricating same.

In one feature of the present invention, the gas laser envelope comprises a metallic tube, preferably of pure aluminum, having a pair of axially spaced transverse metallic wall structures sealed to the tubular portion and defining a gas filled envelope there-between with an intermediate support structure disposed between the transverse walls for supporting an electrically insulative glow discharge tube there within, whereby a more rugged gas laser structure is obtained while facilitating ease of fabrication.

In another feature of the present invention the envelope and main body portion of the gas laser tube comprises a metallic extrusion having an inner tubular portion supported from an outer tubular portion via the intermediary of metallic support legs or vanes, whereby an extremely rugged and inexpensive laser envelope and support structure is obtained.

In another feature of the present invention, the main body portion of a gas laser is formed by counter boring from opposite ends, a concentric tubular metallic extrusion. Transverse end walls are sealed across opposite counterbored ends of the metallic extrusion for defining the envelope of the gas laser in the region in between the end wall structures.

In another feature of the present invention, the inner bore of a concentric tube metallic extrusion is honed and inwardly dimpled to receive an electrically insulative capillary glow discharge tube, which is axially inserted within the honed bore, and held therein by means of an interference fit with the inwardly directed dimples in the wall of the inner tubular portion of the extrusion, whereby the discharge tube is mounted with a high degree of concentricity within the tubular envelope of the glass laser tube and supported therein by means of an extremely rugged support structure.

Other features and advantages of the present invention will become apparent upon a perusal of the following specification taken in connection with the accompanying drawings wherein:

BRIEF DESCRIPTION OF THE DRAWINGS

FIG. 1 is a longitudinally foreshortened sectional view of a prior art gas laser tube incorporating at least a partial metallic envelope, FIG. 2 is an enlarged longitudinally foreshortened sectional view of a gas laser incorporating features of the present invention, FIG. 3 is a transverse sectional view of the structure of FIG. 2 taken along line 3—3 in the direction of the arrows, FIG. 4 is a view similar to that of FIG. 2 depicting an alternative embodiment of the present invention, FIG. 5 is a view similar to that of FIG. 4 depicting an alternative embodiment of the present invention.

DESCRIPTION OF THE PREFERRED EMBODIMENTS

Referring now to FIG. 1 there is shown the prior art He-Ne gas laser tube 11. Gas laser tube 11 includes a hollow metallic main body portion 12 as of aluminum tubing made of type 6061 aluminum alloy. One end of the main body or envelope 12 is closed off by means of a transverse metallic header 13 as of aluminum. The transverse header 13 is sealed at its outer periphery to the end of the tube 12 as by welding at 14.

The other end of the tubular envelope 12 is closed off by means of an outwardly domed glass end wall structure 15 sealed in a gas tight manner to the end of the metallic tube 12 by means of a conventional sealant such as epoxy cement at 16. End wall 15 is centrally apertured and sealed in a gas tight manner, as by glass blowing at 17, to the outer wall of a capillary glass glow discharge tube 18 as of pyrex. The capillary glow discharge tube 18 is supported at its other end by a ground fit with the inside of a central bore 19 in the transverse end wall 13.

The capillary glow discharge tube 18 extends a substantial distance outwardly of the tubular envelope 12 along the axis of the tube 11. A bulbous extension 21 is formed as by glass blowing on the external portion of the capillary discharge tube 18. Bulbous extension 21 is fabricated in gas communication with the central bore of the capillary tube 18. An anode electrode 22 is sealed in the bulbous extension extending through the wall thereof. The outer end of the glow discharge tube 18 is closed off in a gas tight manner by means of a mirror 23 sealed over the end of the discharge tube 18 by use of an epoxy cement at 24.

An aperture 25 is provided in the side of the glow discharge capillary 18 near the other end of the tube 11. A cup shaped insulative baffle 26 as of glass is coaxially disposed of the discharge tube 18 in surrounding relation to aperture 25 for the purpose of spreading out the glow discharge in the region of a cold cathode 27 defined by the inside wall of the aluminum envelope 12 in the region of the aperture 25.

A second disc shaped plate 28, as of aluminum, is outwardly disposed of the transverse header 13 and connected thereto via a deformable neck portion 29. A plurality of tapped bores 31 as of three or four in number are equally spaced around the axis of the disc 28 and placed near the outer periphery thereof. A plurality of adjustment screws 32 are threaded in the tapped bores 31 and bear against the outside surface of the transverse wall 13. The other mirror 33 of the optical resonator is sealed over the central aperture in the outer disc 28 in a gas tight manner as by epoxy cement. The mirror 33 forms the output mirror of the optical resonator and is silvered in such a manner as to allow a small fraction of the incident light thereon to pass therethrough. The mirrors 23 and 33 of the optical resonator are aligned in parallelism by adjusting screws 32 which serve to tilt disc 28 and mirror 33 to achieve parallelism of the mirrors 23 and 33 of the optical resonator.

In operation, a suitable DC potential as of 1800 volts is applied between anode electrode 22 and cold cathode 27 to establish an electrical glow discharge in the capillary bore of the glow discharge tube 18. The glow discharge operates in the conventional laser mode to invert the population densities of the energy levels of the laser gain medium, namely, the He-Ne gas fill. The inverted population densities of the energy levels of the gain medium serve to sustain stimulated coherent emission of optical radiation at the optical resonant frequency of the optical resonator to produce an output optical beam 34 passing through the output mirror 33.

The problem with the prior art laser tube 11 of FIG. 1 is that there is a substantial amount of glass blowing required in the fabrication thereof. More particularly, glass blowing techniques are employed to provide the anode bulb 21, baffle 26, and end closing wall 16. This glass work adds considerably to the fabrication cost and results in a relatively fragile laser tube 11 which generally lacks concentricity between the output beam 34 and the tubular envelope 12 due to the inherent lack of precision in the glass fabrication technique. Moreover, the glass end wall 15 and anode chamber 21 allows light emanating from the glow discharge region of the laser 11 to interfere with other photosensitive components which may be closely packed to the laser tube 11.

Referring now to FIGS. 2 and 3, there is shown a laser tube 41 incorporating features of the present invention. More particularly, the laser tube 41 includes a main body portion 42 which is preferably formed by a hollow metallic extrusion preferably of type 1100 aluminum, which is substantially pure aluminum, i.e., greater than 99% pure. The extrusion includes an inner tubular portion 43 concentrically supported from an outer tubular portion 44 via the intermediary of a plurality of radially directed vane portions 45. In a typical example, there are three radially directed vane portions 45 disposed at 120° intervals around the circumference of the tubular structure. The outer tube 44 has an outside diameter of 1.00 in., a wall thickness of 0.09 in., the vanes 45 have a thickness of 0.12 in., and the inner tube 43 has an outside diameter of 0.355 in. and an inside diameter of 0.275 in.

The extrusion 42 is counterbored from opposite ends to define a cold cathode chamber 46 at one end and an end wall receiving portion 47 at the other end. More particularly the counterbored portions of the extrusion 42 include shoulders 48 and 49 to receive the outer peripheries of disc shaped end walls 51 and 52, as of type 1100 aluminum.

The inside bore of the inner tube 43 is honed to an inside diameter of approximately 0.001–0.002 inch larger than the outside diameter of a capillary glow discharge tube 53 which is axially inserted within the bore in the inner tube 43. The inner tube 43 is indented at 54, as by crimping at 120° intervals at both ends in the regions between the support vanes 45 to provide corresponding inwardly directed protrusions of the bore in the inner tube 43 to provide an interference fit between the outer surface of the capillary discharge tube 53 and such protrusions. Thus, that portion of the inner tube 43 and outwardly directed vanes 45 which remains between the counterbored portions 46 and 47 serves as an intermediate support structure for rigidly supporting the glow discharge tube 53 from, and in axial alignment with, the hollow main body portion 42.

In a typical example, the insulative glow discharge capillary tube 53 is made of pyrex glass having an outside diameter of 7 mm and an inside diameter of 1.5 mm. The capillary tube 53 has a length of 9 ½ inches and passes through a central aperture 56 in end wall 52. The lip of the central aperture 56 includes an axially directed annular projection 57, as 0.100 in. in axial length, 0.278 in. inside diameter, and 0.287 in. outside diameter. The axial projection 57 is sealed in a gas tight manner as by glass solder or epoxy cement to the outside wall of the glass capillary tube 53.

End walls 51 and 52 are sealed in a gas tight manner across opposite ends of the main body portion 42 as by heliarc welds at 58. An exhaust tubulation 59, as of copper or aluminum, is sealed within a bore in end wall 52 for evacuating the main body portion 42. After the main body portion 42 has been evacuated and filled with the laser gain medium, such as a mixture of He and Ne gases, the exhaust tubulation 59 is pinched off, thereby sealing the gas tight envelope of the laser tube 41.

The inside of the capillary bore 53 is expanded in inside diameter at the outer end thereof as by counter boring at 61 to receive a helical anode structure 62, as of tungsten, nickel, or molybdenum wire. More particularly, in a typical example, the expanded bore region 61 has an axial length as of 1.5 in., the helical anode 62 is formed of 0.015 in. tungsten wire wound on a ⅛th in. mandrel for an axial length of approximately 1.2 in. The outer end of the capillary tube 53 is notched to permit passage therethrough of a radially directed leg portion of the tungsten wire helix at 63 for making electrical contact to the anode 62. The outer end of the capillary tube 53 is ground flat and closed off in a gas tight manner via the intermediary of a mirror 23 of the optical resonator of the laser, such mirror 23 being sealed in a gas tight manner to the end of the capillary tube 53 via a seam of epoxy resin at 64 or solder glass.

A protective cup 65, as of aluminum, is affixed over the outer end of the capillary tube 53 as by an epoxy cement at 66. A flexible electrical connecting wire 67, as of nickel or copper, is connected at one end to the tungsten or nickel anode lead 63 and passes through a feedthrough insulator 68 in the protective cup 65 for making electrical connection to the anode 62.

The other end of the laser tube 41 includes the deformable neck 29, output mirror 33, and adjustable plate 28, all as previously described with regard to FIG. 1.

During assembly, the precise axial spacing between the mirrors 23 and 33 of the optical resonator is obtained by holding the main body portion 42 of the laser in a suitable jig and axially inserting the capillary glow discharge tube 53 from the left hand end of the tube until the precise axial spacing is obtained between the inside surface of the mirror 23 and the inside surface of mirror 33. With this spacing established the glass solder or other sealant is applied to the glass capillary tube at the axial projection 57 for sealing the discharge tube 53 into the envelope of the laser tube 41 and for fixedly securing the axial spacing of the optical resonator. The annular inside wall region 27 of the envelope 42 in the cathode region 46 serves as the cold cathode electrode of the laser in the manner as described in an article appearing in a review of Scientific Instruments Volume 36 Number 10 of October 1965 at pages 1,493 and 1,494.

The advantages of the laser tube of the present laser tube 41 as contrasted with the prior laser tube 11 are that fabrication is greatly simplified because all glass blowing steps have been eliminated in the fabrication process. In addition, the tube 41 is much more rugged, as the relatively fragile glow discharge tube 53 is rigidly supported in precise concentricity relative to the outer diameter of the main body portion 42. In this manner one laser tube 41 may be substituted for another 41 without having to realign the laser tube relative to the output optics. Furthermore, the glow discharge region is completely closed except for the output mirror 33 by means of an opaque envelope 42 and end cap 65 such that the tube structure self shielding with regard to stray optical radiation otherwise emanating from the laser tube 41. Furthermore, the operating lifetime of the laser tube 41 is substantially increased, as the aluminum is not as porous as the previous glass envelope, such that the noble gases do not leak from the envelope structure of the present invention as rapidly as they do from the envelope structure of the prior art.

Referring now to FIG. 4, there is shown an alternative embodiment of the invention. More specifically there is shown a gas laser tube 71 having a main body portion 42 similar to that previously described with regard to FIG. 2 and 3 with the exception that two axially counterbored extrusions are joined together at adjacent ends as by threading over a threaded sleeve 72 which serves to space apart the adjacent ends of the tubular sections to define a cold cathode region with interior bore of sleeve 72 forming the cold cathode 27. Adjacent ends of the outer tubular envelope sections 44 are sealed together in a gas tight manner as by welding at 73. Helical anodes 62 are provided at opposite ends of the axially aligned glow discharge tubes 53. Anode connections are made to the anodes 62 via electrically insulated gas tight leads 74 passing through gas tight feed-through insulator members 75 provided in end closing walls 76 and 77 which are sealed in a gas tight manner across opposite ends of the main body portion 42. The aligned glow discharge tubes 53 are sealed off in a gas tight manner at one end via a mirror 23 of the optical resonator and at the other end via an optically transparent sealing plate 78. Output closing wall 77 is sealed in a gas tight manner by means of output mirror 33 of the optical resonator. The exhaust tubulation 59 is provided in one of the end walls and is pinched off after evacuation and filling of the envelope 42 with the laser gain medium.

The advantages of the laser tube 71 of FIG. 4 are that for a given axial length of glow discharge region within the laser tube 71, only ½ of the applied voltage need be applied between the anode and cathode to establish the glow discharge. Furthermore, lasers of much longer length may be readily fabricated utilizing the technique of FIG. 4 wherein more than two glow discharge tubes are axially aligned within the envelope or main body portion 42.

Referring now to FIG. 5 there is shown an alternative laser tube embodiment 81 incorporating features of the present invention. Laser tube 81 is similar to that of FIG. 4 with the exception that the positions of the anode and cathode have been reversed and a unitary main body portion 42 is employed as contrasted with a plurality of body sections joined together at adjacent ends. More particularly, the main body comprises an extrusion as shown in FIGS. 2 and 3 counterbored at opposite ends to provide cold cathodes 27 at opposite ends of the envelope 42. The glow discharge tube 53 comprises two lengths similar to those shown in FIG. 4 which are joined together at their anode ends. The anode structure 62 is centrally disposed of the tubular body 42.

A tapped access hole 82 is provided midway along the length of the main body 42 for access to the anode region. In addition, the inner tube 43 includes an access hole 83 in transverse axial alignment with access hole 82. The anode structure 62 includes a lead 84 sealed in a gas tight manner as by a glass bead to and passing through the relatively thin wall portion of the glow discharge tube 53. The lead 84 is flexible and was wrapped around the tube 53 in a recessed portion thereof when the tube was axially inserted within the inner tubular portion 43 of the support structure.

An electrically insulative tube 85, as of glass, is inserted over the lead 84 and sealed in a gas tight manner to the outside wall of the discharge tube 53. The insulated lead 84 is brought through a central aperture in a threaded plug 86 which is threaded into the access hole 82 and sealed by epoxy cement for closing same. The insulative sleeve 85 is sealed in a gas tight manner to the lip of the central aperture in the plug 86 as by epoxy cement. Anode potential is applied to lead 84 for establishing the glow discharge within the discharge tube 53.

Opposite ends of the main body portion 42 are closed off by end closing walls 76 and 77. End wall 76 has mounted thereto one of the mirrors 23 of the optical resonator, whereas the other end wall 77 is centrally apertured and closed by means of the output mirror 33.

Laser tube 81 of FIG. 5 has all the advantages of the structure of FIG. 4 plus additional advantages of ease of manufacture as contrasted with the structure of FIG. 4.

What is claimed is:

1. In a gas laser tube:
a hollow elongated unipotential metallic envelope means;
metallic wall means extending transversely of said envelope means in axially spaced relation as unipotential portions of said envelope means;
means for defining at least a portion of a gas tight enclosure within said envelope means between said metallic transverse wall means;
an elongated electrically insulative glow discharge tube disposed within said elongated metallic envelope means in axial alignment therewith;
support means disposed (within said envelope means) intermediate said transverse wall means for supporting said glow discharge tube from that portion of said hollow metallic envelope means intervening between said transverse wall means;
means defining an optical resonator disposed in axial alignment with said glow discharge tube;
means filling said glow discharge tube with a fluid laser gain medium; and
means for establishing an electrical discharge within said gain medium within said discharge tube for supporting sustained stimulated coherent emission of optical radiation within said optical resonator of the laser.

2. The apparatus of claim 1 wherein said elongated metallic envelope means comprises a metallic extrusion having an inner bore for containing and supporting said glow discharge tube via the intermediary of a portion of said extrusion intervening radially between said inner bore and an outer wall of said metallic extrusion.

3. The apparatus of claim 2 wherein said portion of said extrusion intervening between said inner bore and said outer wall comprises at least one radially extending metallic web portion.

4. The apparatus of claim 2 wherein said metallic extrusion is counterbored at one end thereof to define by the unbored region of said extrusion said metallic support structure for supporting said discharge tube within said inner tubular portion of said extrusion.

5. The apparatus of claim 4 wherein said inner bore is indented to provide an out-of-round geometry for said inside bore to receive and hold the outer wall of said discharge tube by means of an interference fit therebetween.

6. The apparatus of claim 2 wherein said metallic extrusion is of aluminum having a purity of aluminum greater than 99%.

7. The apparatus of claim 1 wherein said intervening support means comprises a metallic support means extending radially outwardly from said glow discharge tube to a wall portion of said hollow metallic envelope means of larger inside radius than that of said discharge tube, and wherein said metallic support means is a unipotential means with said envelope means.

* * * * *